Patented Dec. 20, 1938

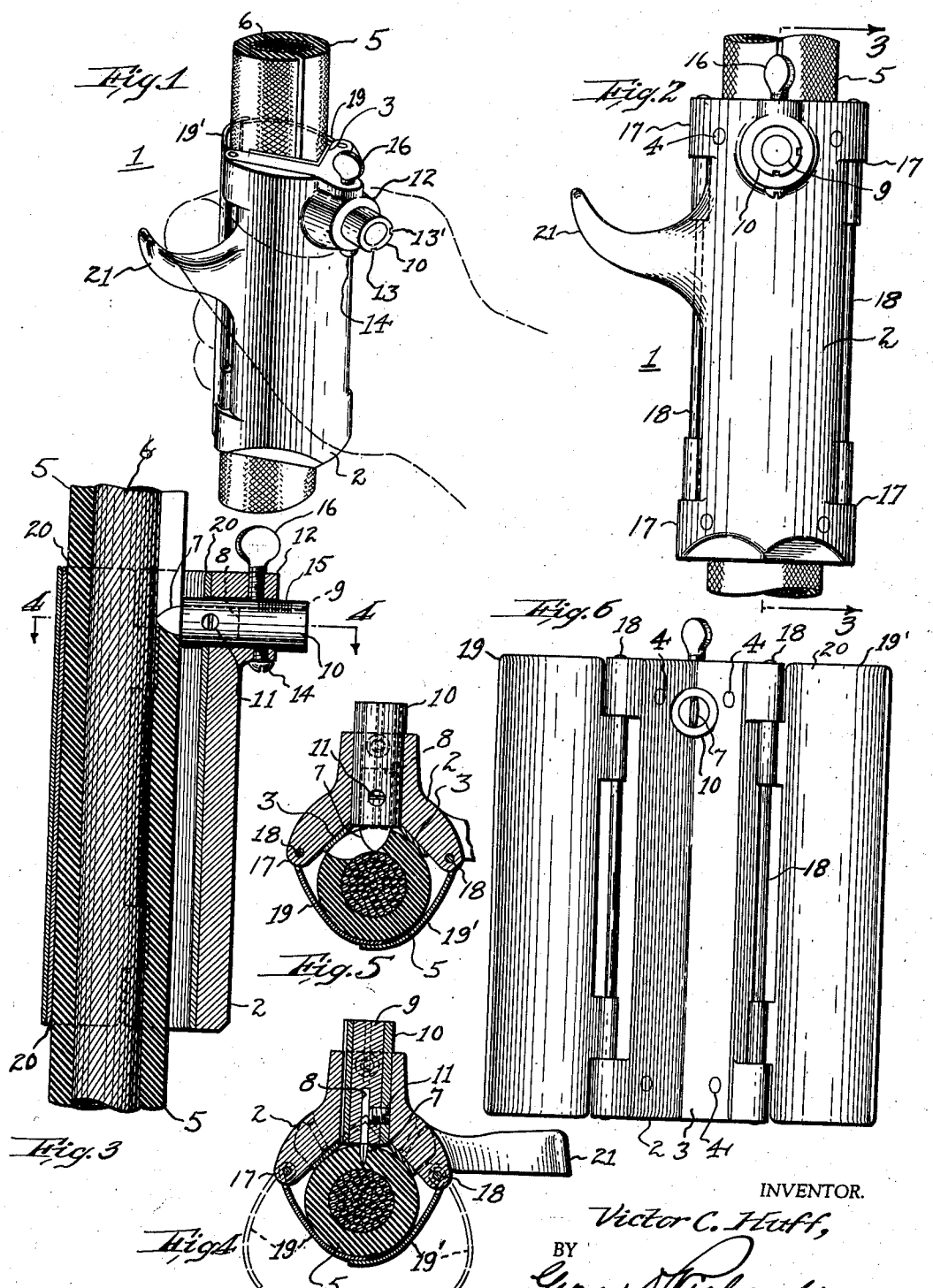

2,141,002

UNITED STATES PATENT OFFICE 2,141,002

CABLE STRIPPER

Victor C. Huff, Bloomfield, N. J.

Application December 24, 1936, Serial No. 117,575

4 Claims. (Cl. 81—9.5)

This invention relates, generally, to electricians' tools and the invention has reference, more particularly, to a novel cable stripper for use in cutting and removing insulation from electric cables and wires.

Heretofore, considerable difficulty has been experienced by electricians in removing insulation from electrical cables or conductors for the purpose of making connections. Various tools have been designed in the past for facilitating the removal of insulation, but these tools have not been satisfactory in service owing either to the difficulty of operating the same, or to the fact that they are adapted to operate on but a single size or limited sizes of cable.

The principal object of the present invention is to provide a novel cable stripper that is so constructed as to enable easy stripping of cable insulation in use, the said device being equally applicable for use in connection with differing sizes of cable or insulated conductors.

Another object of the present invention lies in the provision of a novel cable stripper of the above character that is so constructed and arranged as to enable the same to be easily gripped in the user's hand, the natural finger pressure of the hand serving to constrict relatively movable parts of the stripper about the cable and at the same time force the cable toward the cutting blade and thus cause the latter to penetrate inwardly through the cable insulation, whereupon by bodily moving the stripper, the cable insulation is slitted as desired, the said stripper being equally adapted for cutting circumferential and longitudinal slits in the cable insulation.

Still another object of the present invention is to provide a novel cable stripper of the above character comprising a hand grippable body portion provided with hinged overlapping gates adapted to be opened for receiving the cable into said body portion, the subsequent closing of said gates enabling the application of finger pressure thereto to force the cable against the cutting element of the tool for effecting the stripping of the cable.

Other objects of this invention, not at this time more particularly enumerated, will be clearly understood from the following detailed description of the same.

The invention is clearly illustrated in the accompanying drawing, in which:

Fig. 1 is a perspective view showing the cable stripper applied to a cable and held in the user's hand as when slitting the cable insulation.

Fig. 2 is a view in front elevation of the structure shown in Fig. 1.

Fig. 3 is a sectional view taken along lines 3—3 of Fig. 2.

Fig. 4 is a sectional view taken along lines 4—4 of Fig. 3.

Fig. 5 is a view similar to Fig. 4, but illustrates the knife blade positioned for slitting the cable insulation circumferentially, and Fig. 6 is a rear view of the cable stripper showing the gates thereof in open position preparatory to receiving a cable therebetween.

Similar characters of reference are employed in said views, to indicate corresponding parts.

Referring now to said drawing, the reference numeral 1 designates the novel cable stripper of this invention as a whole. Cable stripper 1 comprises a main or body portion 2 adapted to be held in the palm of the hand of the user. Body portion 2 is of substantially semi-cylindrical shape having a substantially semi-circular exterior surface and an angular interior surface. This body portion is preferably made of light metal such as aluminum and in order that its angular interior surface shall have a desired degree of hardness for contacting cables in use without undue wear, the angular interior surface is shown hardened as by use of a suitable hard angular plate 3 of steel or other hard material having the shape of an angle bar, though being thinner than an ordinary angle bar. Angular plate 3 is shown secured to the softer backing portion of the member 2 by rivets 4. The sides of the plate 3 preferably extend at right angles to each other and are adapted to receive the cable 5 therebetween.

In order to enable the slitting of the cable insulation down to the wires 6 of cable 5, there is provided a double edge, pointed knife blade 7 that has its shank positioned in a transverse slot 8 provided in a cylindrical core member 9 that is retained within the cylindrical bore of a sleeve 10 by means of a set screw 11. Preferably the screw 11 is threaded through the wall of sleeve 10 and through core 9 to engage the shank of knife blade 7, thereby serving to fixedly retain both the knife blade 7 and core 9 in assembled relation with sleeve 10.

The body portion 2 is formed with a boss 12 that is provided with a cylindrical aperture for slidingly receiving the sleeve 10, whereby the blade 7 may project radially into the hollow interior of body portion 2 for engaging and cutting the cable insulation. In order to position the sleeve 10 so that the plane of blade 7 may extend either along the longitudinal axis of the hollow interior of body portion 2 or at right angles thereto for selectively producing longitudinal and transverse cuts in the cable insulation, the sleeve 10 is provided with slots or keyways 13 and 13' that are displaced 90° with respect to each other. These keyways are adapted to be engaged by a key provided on the end of a screw 14 threaded through the wall of boss 12. Thus, when screw 14 engages slot 13, the knife blade 7 is positioned for cutting longitudinal slits in the cable 5 and when screw 14 engages slot 13' the blade 7 is adapted to cut circumferential slits in the cable insulation.

The extent to which the blade 7 projects into the hollow interior of body portion 2 will vary with the size of the cable worked on, and in order to set the blade 7 at the proper radial position, the sleeve 10 is provided with graduations, i. e. a scale 15 that may be read against the outer edge of boss 12, the said scale indicating various sizes of cables. A thumb screw 16 is threaded through the wall of boss 12 for engaging and locking the sleeve 10 in desired adjusted position.

Body portion 2 is provided at its upper and lower side edge portions with lugs 17 that carry hinge pins 18 extending longitudinally of the body portion, upon which hinge pins are pivotally mounted gates 19 and 19' whose lengths are preferably equal to that of the body portion. The gates 19 and 19' are preferably of the same hard material as the angular plate 3 and these members preferably have their upper and lower inner edges beveled somewhat as indicated at 20 so as not to scar the cable 5 in use.

The gates 19 and 19' are of curved cross section as especially shown in Figs. 4 and 5 for suitably engaging the exterior of the cable 5 opposite the plate 3 and knife blade 7. These gates are adapted to be turned to open position, shown in dash lines in Fig. 4, when it is desired to apply the cable stripper to a cable. Then, by applying the palm of the hand to the body portion 2, the thumb and fingers may be conveniently employed to close together the gates 19 and 19' upon the cable. This closing of the gates is accomplished by the simple and natural closing of the hand, the fingers and thumb serving to move and hold the gates into the positions shown in Figs. 4 and 5 with their free edge portions overlapping one another opposite the knife blade 7. The natural finger and thumb pressure upon the exterior surfaces of the gates press them toward closed and overlapping position, causing these gates to press the cable against the blade 7 so that the pointed end of the blade readily cuts through the cable insulation down to the wires 6. The body portion 2 is formed with a projection 21 for receiving the user's thumb so that a firm and non-slipping grip may be obtained upon the body portion 2. Under these conditions, and with the blade 7 disposed parallel to the longitudinal axis of the cable stripper, as shown in Fig. 4, the cable is forced against the point of said blade 7 thereby causing the latter to penetrate the cable insulation to the proper depth as determined by the radial setting of sleeve 10; whereupon it is merely necessary to pull the cable stripper along the length of the cable to cause the blade to shear through said cable insulation so as to slit the same longitudinally, as shown in Fig. 1.

With the sleeve blade 7 set transverse to the longitudinal axis of the cable stripper, as shown in Fig. 5, it is merely necessary to turn the cable stripper around the cable by twisting the wrist to obtain a circumferential slit through the cable insulation. By making two such circumferential slits spaced from one another and then slitting the cable insulation longitudinally therebetween, a section of the cable insulation may be readily removed.

It will be noted that the novel cable slitter may be readily used in slitting different sizes of cable by merely adjusting sleeve 10 radially, the gates 19 and 19' accommodating themselves to any diameter of cable within relatively wide limits.

Although it is preferable to employ two opposed gates 19—19' as shown, it will be obvious that a single gate could be effectively used as a means to engage the exterior side of the cable when entered in the tool body channel, thereby to force the cable against the cutting blade 7.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:—

1. A stripper for removing insulation from cables of various diametric sizes comprising, a body portion having an outwardly open longitudinally extending V-shaped cable receiving channel, a cutting knife carried by said body portion so as to project into said channel from the apex thereof, and a pair of cooperating gates respectively hinged to opposite longitudinal sides of said body portion and mutually interfoldable across the open side of said channel, said body portion and infolded gates being adapted to be embraced and gripped by the hand of the user to cause said gate members to close exteriorly over and press a cable into centered engagement with the angular walls of said channel so that the cable insulation is penetrated by the cutting knife and at the same time said cable is held in aligned relation to the latter as the stripper is moved relative to the cable.

2. A cable stripper as defined in claim 1 wherein said body portion is provided with a laterally projected thumb engageable projection to assist in imparting movement to the stripper relative to the cable.

3. A cable stripper as defined in claim 1 wherein the cutting knife is adjustably movable relative to the body portion channel and radially of the cable entered within the later to thereby accommodate the same to the thickness of the cable insulation, said cutting knife having graduations on the shank thereof for determining adjusted positions thereof, and means to secure said knife in selected adjusted position.

4. A cable stripper as defined in claim 1 wherein the cutting knife is selectively adjustable both axially and rotatably for producing either longitudinal or circumferential cuts in cable insulation and according to the size of a given cable, and means for securing said cutting knife in desired adjusted position.

VICTOR C. HUFF.